United States Patent
Meaney et al.

[11] Patent Number: 6,163,857
[45] Date of Patent: Dec. 19, 2000

[54] COMPUTER SYSTEM UE RECOVERY LOGIC

[75] Inventors: Patrick James Meaney; Pak-kin Mak; William Wu Shen; Gary Eugene Strait, all of Poughkeepsie, N.Y.

[73] Assignee: International Business Machines Corporation, Armonk, N.Y.

[21] Appl. No.: 09/070,389

[22] Filed: Apr. 30, 1998

[51] Int. Cl.$^7$ ................................. G06F 11/00
[52] U.S. Cl. ............................... 714/7; 714/758
[58] Field of Search ............... 714/7, 758, 764, 714/42, 54, 763, 773, 6, 8; 711/163, 152

[56] References Cited

U.S. PATENT DOCUMENTS

| | | | |
|---|---|---|---|
| 5,214,652 | 5/1993 | Sutton | 714/10 |
| 5,502,814 | 3/1996 | Yuuki | 714/32 |
| 5,544,341 | 8/1996 | Nakagawa et al. | 711/118 |
| 5,630,055 | 5/1997 | Bannon et al. | 714/52 |
| 5,632,013 | 5/1997 | Krygowski et al. | 714/7 |
| 5,912,906 | 6/1999 | Wu et al. | 714/763 |
| 5,953,351 | 9/1999 | Hicks et al. | 714/763 |
| 5,958,068 | 9/1999 | Arimilli et al. | 714/8 |
| 5,958,072 | 9/1999 | Jacobs et al. | 714/30 |

OTHER PUBLICATIONS

"Hardware Retry Mechanism for Multistage Interconnection Networks for Parallel Computers" IBM Technical Disclosure Bulletin, vol.30, No.1, Jun.1987, pp.422–428.

"Recovery Mechanisms for Fetch&Op Instruction Execution Errors" IBM Technical Disclosure Bulletin, vol.29, No.10, Mar.1987, pp.4495–4500.

"Checkpoint Register" IBM Technical Disclosure Bulletin, vol.27, No. 4A, Sep. 1984, pp. 2231–2232.

*Primary Examiner*—Ly V. Hua
*Attorney, Agent, or Firm*—Lynn L. Augspurger

[57] ABSTRACT

A computer system having central processors (CPs), an associated L2 cache, and processor memory arrays (PMAs), is provided with store logic and and fetch logic used to detect and correct data errors and to write the resulting data the associated cache. The store logic and and fetch logic blocks UEs from the cache for CP stores, for PMA (mainstore) fetches/loads, and for cache-to-cache loads, and with uncorrectable error recovery cache fetch and store logic injects 'Special UEs' into the cache when loads cannot be blocked and abends CP jobs for UEs during CP stores, for UEs from PMA, for UEs from remote cache, and for UEs from local cache. This logic performs reconfiguring of memory when UEs are detected in memory and also blocks cache data propagation on UEs for CP fetches, for Cache-to-Cache transfer if data is unchanged, and for PMA castouts if data is unchanged, as well as forces castouts when UEs appear on changed cache data; injects 'Special UEs' for UEs detected on changed cache data; invalidates the cache when UEs are detected in the local cache; and only deletes cache entries that have repeated failures.

17 Claims, 4 Drawing Sheets

COMPUTER SYSTEM UE RECOVERY LOGIC

FIELD OF THE INVENTION

This invention is related to computers and computer systems and in particular to a method for recovering from uncorrectable data errors.

Glossary:

Abend is an abnormal end.

PMA means Processor Memory Array or Main Storage.

BACKGROUND OF THE INVENTION

In a computer system, a correctable error (CE) detected in the L2 cache (second-level cache), is recoverable using ECC (Error Correction Code) correction to correct the data. For an uncorrectable error (UE), however, the ECC correction cannot correct the data. It is the responsibility of the hardware to ensure that the data is not used.

One way to accomplish this is to Checkstop the system (ie. stop the system and restart all pending jobs). With cache designs becoming more complex and more dense, there is an increasing probability that UEs will occur. It is important for these systems to keep running, even if a few jobs have to be abended, so it would be desirable to keep the system running in spite of UEs which have traditionally caused a checkstop of the system because of the indicated hardware error.

SUMMARY OF THE INVENTION

The preferred embodiment is used to keep a computer system running in spite of hardware errors without causing Data Integrity errors to any jobs that are kept running.

These and other improvements are set forth in the following detailed description. For a better understanding of the invention with advantages and features, refer to the description and to the drawings.

DETAILED DESCRIPTION OF THE INVENTION

Figure 1:
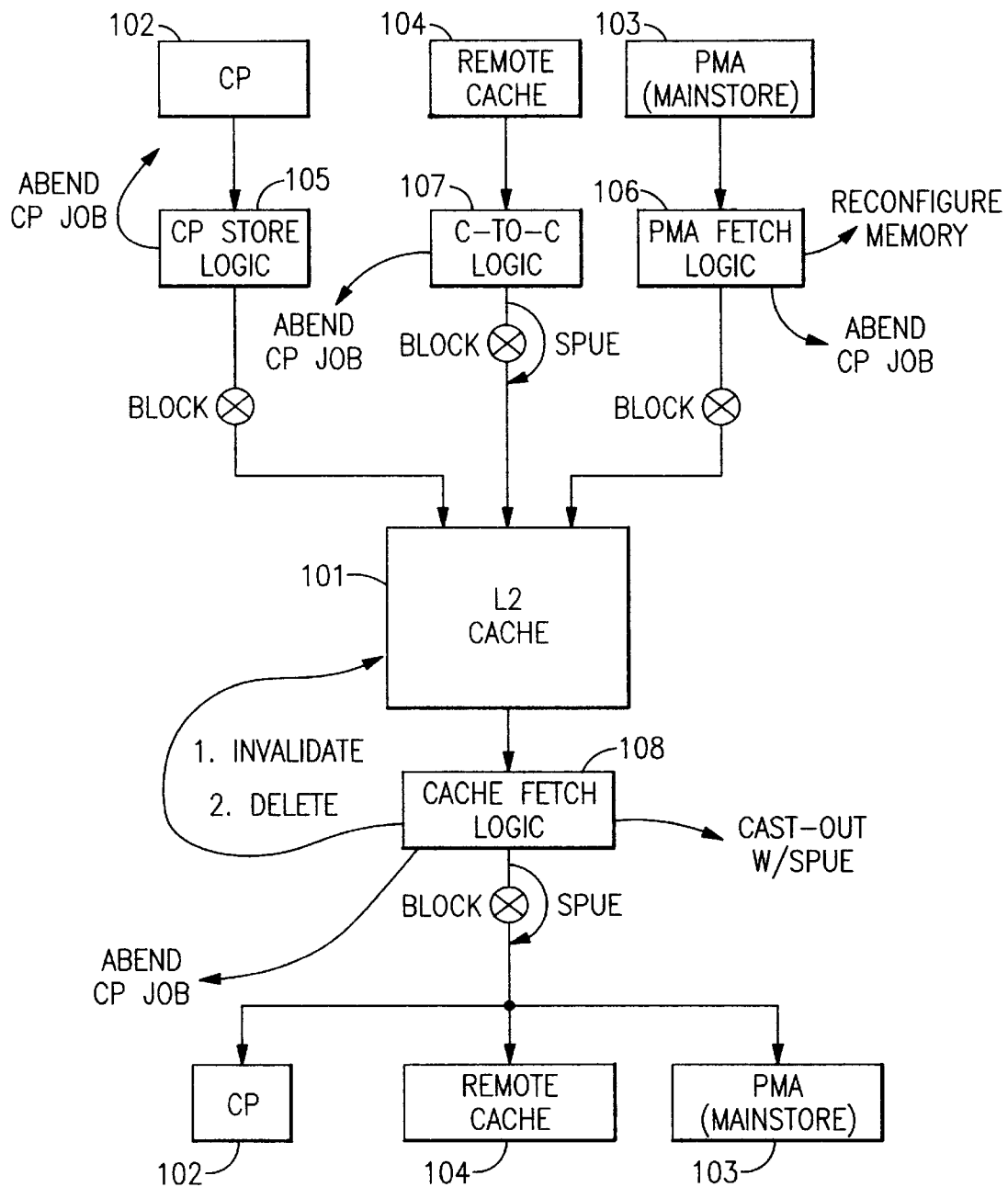
FIG. 1 illustrates the high-level data flow of the preferred embodiment.

Turning now to the invention in greater detail, FIG. 1 illustrates the high-level dataflow of the preferred preferred embodiment of the invention.

The preferred embodiment consists of one or more central processors (CPs), 102, each connected to CP Store Logic, 105, used to detect and correct data errors and write the resulting data into the cache, 101.

The preferred embodiment also consists of one or more processor memory arrays (PMAs), 103, connected to PMA fetch logic, 106, used to detect and correct data errors and write the resulting data into the cache, 101.

The preferred embodiment also consists of a remote cache 104, connected to cache-to-cache logic, 107, used to detect and correct data errors and write the resulting data into the cache, 101.

The preferred embodiment also consists of cache fetch logic, 108, used to detect and correct data errors and transfer the resulting data to the CPs, 102, PMAs, 103, and/or remote cache, 104.

Figure 2:
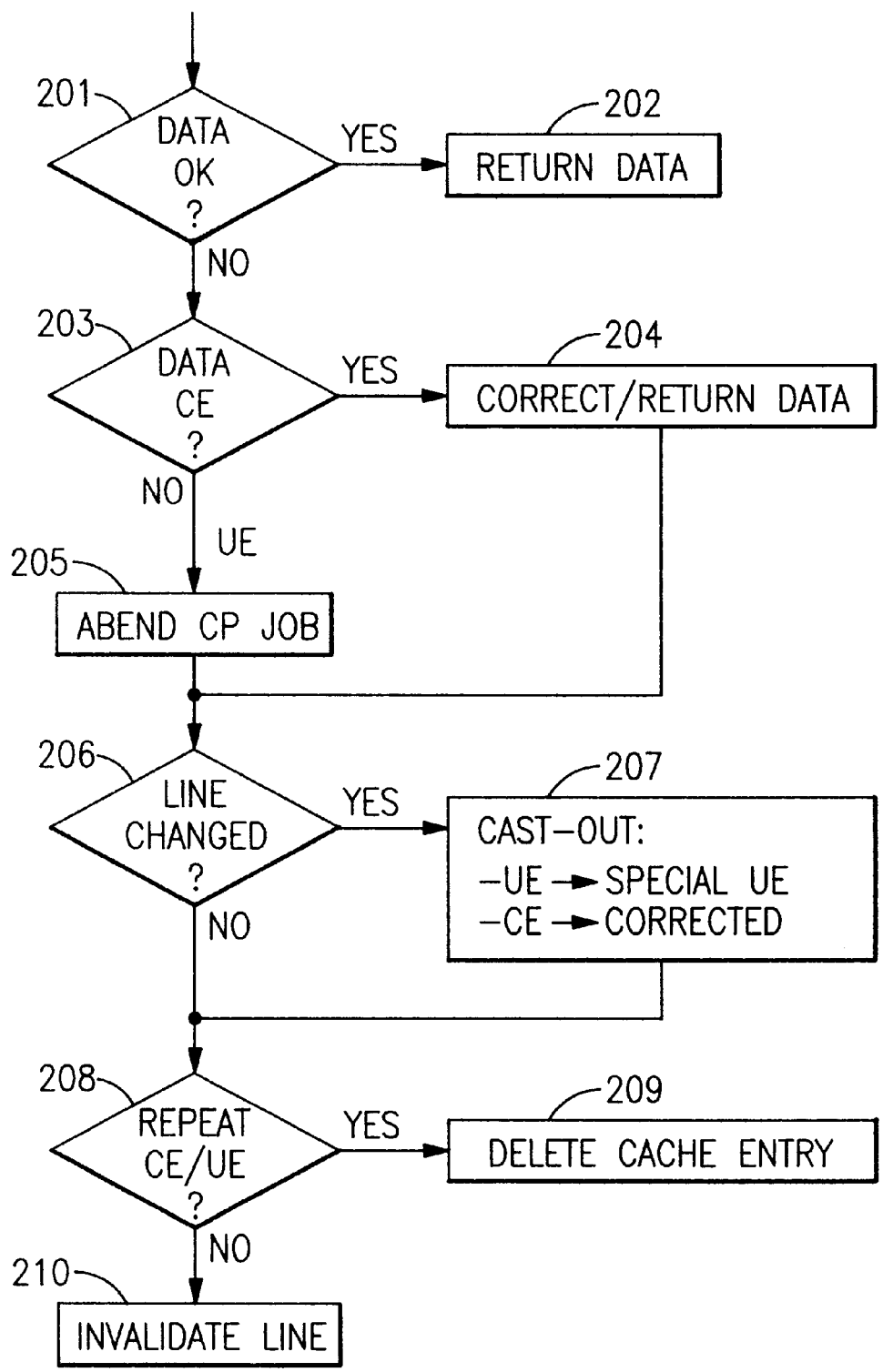
FIG. 2 illustrates the flow chart of the method for handling data from the cache in the preferred embodiment.

Turning now to the invention in greater detail, FIG. 2 illustrates the process steps that are performed by cache fetch logic, 108, of the preferred embodiment. The following steps are performed while reading data out of the cache in order to prevent escalation of defective data to the rest of the system:

1. Data is checked for Errors, 201. If no errors exist, original data is returned for processing, 202. No other action is performed.
2. Data is checked for correctable errors (CEs), 203. If a CE exists, data is corrected and returned for processing, 204. Proceed to step 4.
3. When a dataflow UE occurs, (Not CE and not OK), the CP is notified to abend the CP job, 205.
4. When an L2 cache fetch CE or UE occurs, it needs to be purged.

The line containing the bad data is checked to see if it was changed, 206. If changed, the data must be cast-out to the main store, 207, correcting any CEs and changing UEs to 'Special UEs'. A 'Special UE' is a UE pattern whose syndrome has a hamming distance of at least 2 from that of any CE or good data pattern. This is used to ensure that the data will continue to be unused.

If the cache entry has previously had CEs or UEs, 208, the cache is likely to be defective. Therefore, the cache entry is deleted, 209, so the defective cache does not cause more errors.

If there was no previous CE or UE, line should be marked invalid, 210, but can be used again because the error could have been a soft error or caused by the load of an error on a changed line.

Figure 3:
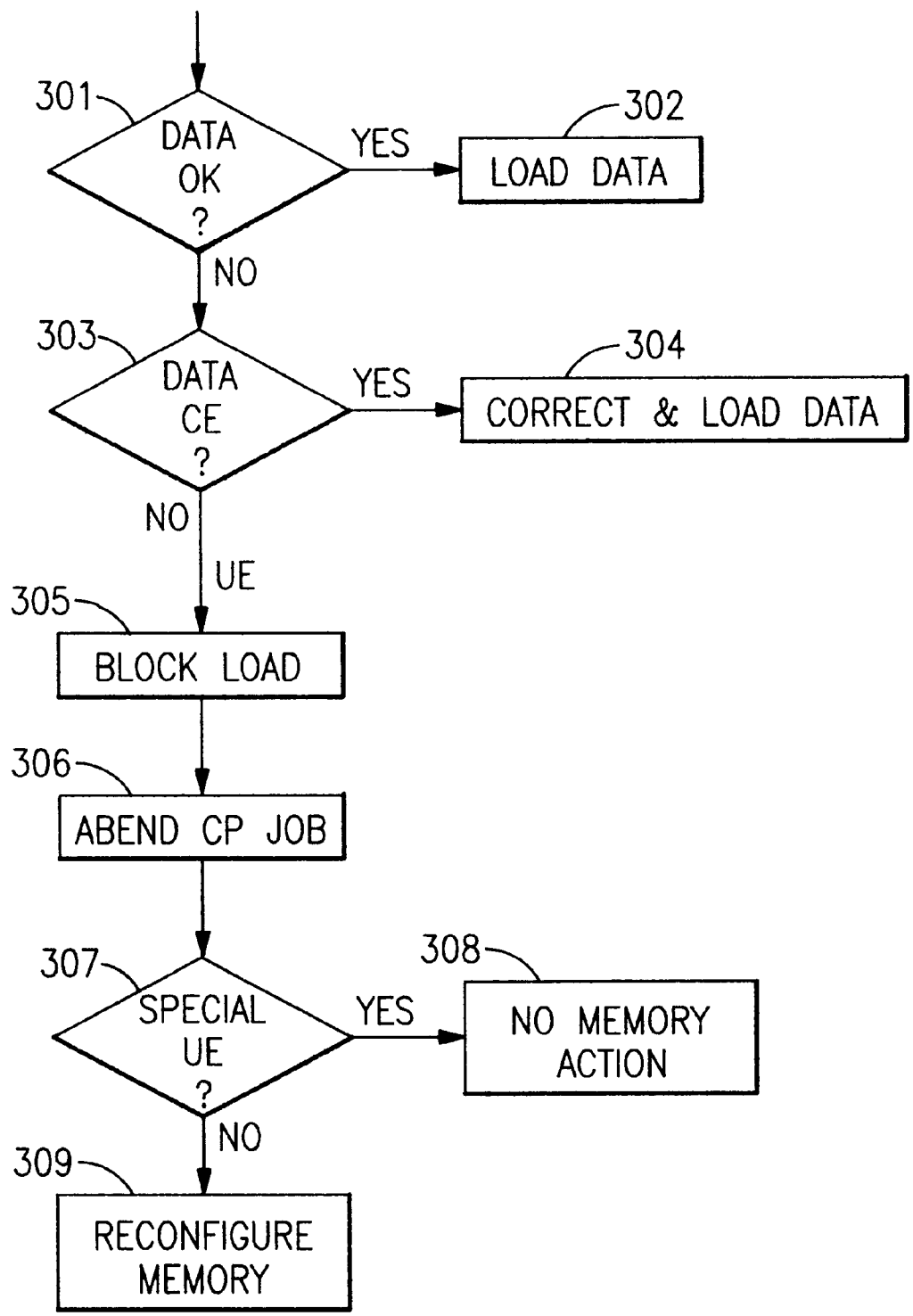
FIG. 3 illustrates the flow chart of the method for handling data from the main storage to the cache in the preferred embodiment.

FIG. 3 illustrates the process steps that are performed by PMA fetch logic, 106, of the preferred embodiment. The following steps are performed while reading data out of the cache in order to prevent escalation of defective data to the rest of the system, while keeping degradation of memory and resources at a minimum:

1. Data is checked for Errors, 301. If no errors exist, original data is loaded into the cache, 302.
2. Data is checked for correctable errors (CEs), 303. If a CE exists, data is corrected and loaded into the cache, 304.
3. When a dataflow UE occurs, (Not CE and not OK), the data is blocked from entering the cache, 305. Also, the CP is notified to abend the CP job, 306.
4. The UE syndrome is checked to see whether it is a 'Special UE', 307. If it is a 'Special UE', no memory degradation occurs, 308, because the bad data was due to a cache failure, not memory.
5. If the UE is NOT a 'Special UE', the bad memory page is taken offline, 309, to avoid more job abends due to that defective memory.

Figure 4:
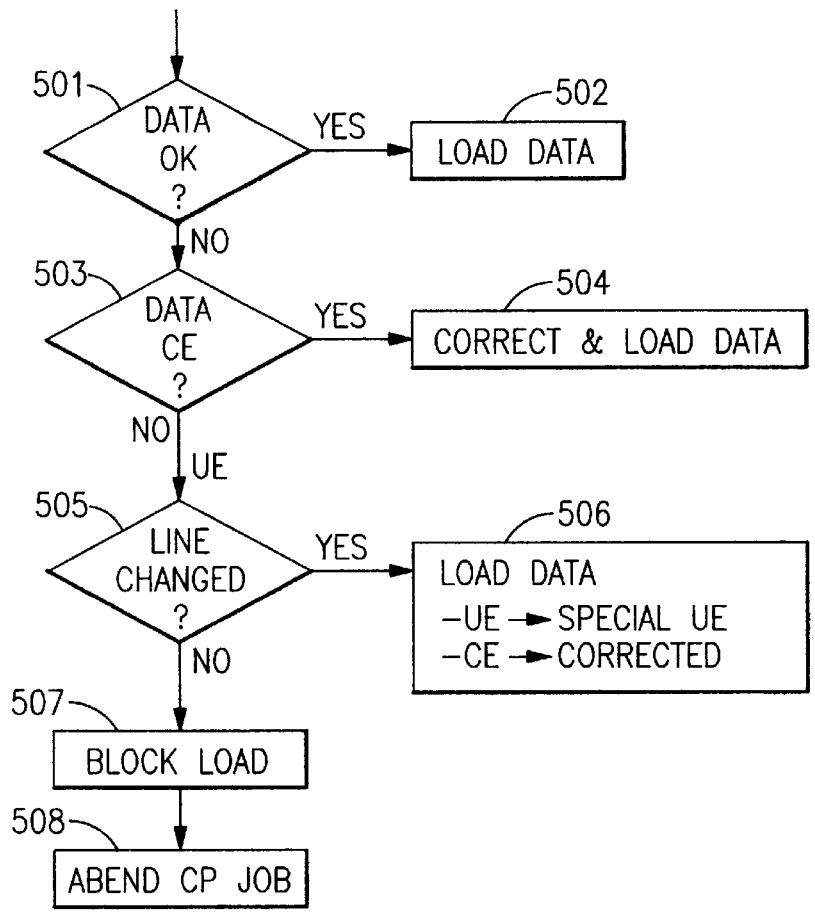
FIG. 4 illustrates the flow chart of the method for handling CP store data to the cache in the preferred embodiment.

FIG. 4 illustrates the process steps that are performed by CP store logic, 105, of the preferred embodiment. The following steps are performed while storing data from the CPs to the cache:

1. Data is checked for Errors, 401. If no errors exist, original data is stored into the cache, 402.
2. Data is checked for correctable errors (CEs), 403. If a CE exists, data is corrected and stored into the cache, 404.

3. When a dataflow UE occurs, (Not CE and not OK), the CP store is blocked from the cache, 405, and the CP is notified to abend the CP job, 406.

Figure 5:
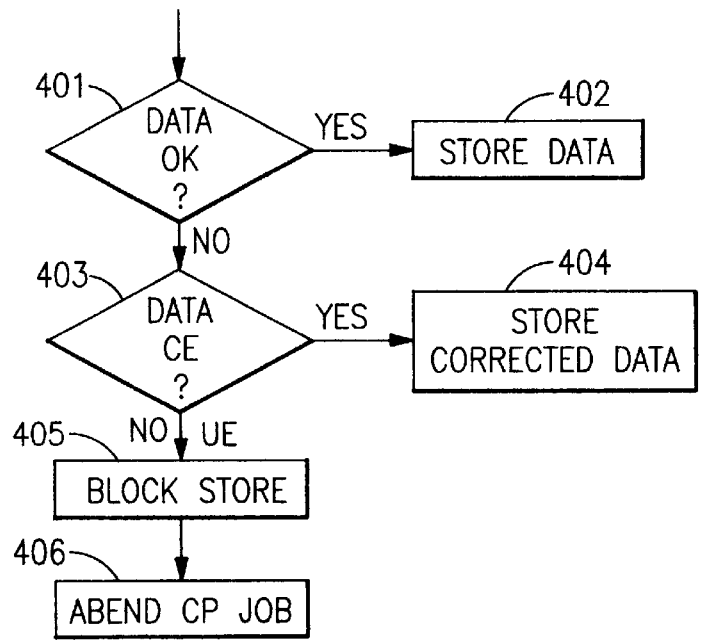
FIG. 5 illustrates the flow chart of the method for handling cache-to-cache data transfers in the preferred embodiment.

FIG. 5 illustrates the process steps that are performed by the cache-to-cache logic, 107, of the preferred embodiment. The following steps are performed while storing data from the remote cache to the local cache:

1. Data is checked for Errors, 501. If no errors exist, original data is loaded into the local cache, 502.
2. Data is checked for correctable errors (CEs), 503. If a CE exists, data is corrected and loaded into the local cache, 504.
3. When a dataflow UE occurs, (Not CE and not OK), the line must be checked to see if it was changed, 505. If it was changed, the line is into the local cache, 506, correcting any CEs and changing UEs to 'Special UEs'. This protects the UE data from being used.
4. When a line containing a UE was not changed, the cache load is blocked for that line, 507, and the CP is notified to abend the CP job, 508.

In summary, our computer system now has uncorrectable error recovery cache fetch and store logic as well as part of the logic each central processor is connected to used to detect and correct data errors and to write the resulting data into said associated cache, which also includes error correction logic for detecting and correcting correctable errors in said associated cache, said error correction logic not being responsible for correcting an uncorrectable error (UE), and checkstop logic for stopping the system and for restarting pending jobs. The combined method and apparatus we have described blocks UEs from the cache for CP stores, for PMA (mainstore) fetches/loads, and for cache-to-cache loads. The uncorrectable error recovery cache fetch and store logic injects 'Special UEs' into the cache when loads cannot be blocked and abends CP jobs for UEs during CP stores, for UEs from PMA, for UEs from remote cache, and for UEs from local cache. This logic performs reconfiguring of memory when UEs are detected in memory and also blocks cache data propagation on UEs for CP fetches, for Cache-to-Cache transfer if data is unchanged, and for PMA castouts if data is unchanged. Further this logic forces castouts when UEs appear on changed cache data; injects 'Special UEs' for UEs detected on changed cache data; invalidates the cache when UEs are detected in the local cache; and only deletes cache entries that have repeated (hard) failures. This uncorrectable error recovery cache fetch and store logic keeps the system running in spite of detected uncorrectable hardware errors instead of checkstopping the system without causing data integrity errors to any jobs that are kept running by keeping the system running.

While we have described the preferred embodiments of the invention, it will be understood that those skilled in the art, both now and in the future, may make make various improvements and enhancements which fall within the scope of the claims which follow. These claims should be construed to maintain the proper protection for the invention first disclosed.

What is claimed is:

1. A computer system comprising,
    one or more central processors (CPs),
    an associated cache for said processors,
    one or more processor memory arrays (PMAs),
    each central processor being connected to a store logic and a fetch logic used to detect and correct data errors and to write resulting data into said associated cache, and wherein said store logic and said fetch logic perform error correction logic operations for detecting and correcting correctable errors in said associated cache, and
    said error correction logic operations are not being responsible for correcting an uncorrectable error (UE), and
    operate as uncorrectable error recovery cache fetch and store logic operations for keeping the system running in spite of detected uncorrectable hardware errors without causing data integrity errors to any jobs that are kept running by keeping the system running.

2. The computer system according to claim 1 wherein said associated cache is coupled to a remote cache connected to cache to cache logic used to detect and correct errors and write the resulting data into the associated cache.

3. The computer system according to claim 2 wherein said uncorrectable error recovery cache fetch and store logic operations are used to detect and correct data errors and transfer the resulting data to any of the CPs, to any of the one or more processor memory arrays (PMAs), and to any remote cache.

4. The computer system according to claim 3 wherein said uncorrectable error recovery cache fetch and store logic operations, during reading data out of the cache in order to prevent escalation of defective data to the rest of the system when a dataflow uncorrectable error occurs, notifies a CP to abend the CP's job.

5. The computer system according to claim 4 wherein said uncorrectable error recovery cache fetch and store logic operations, during reading data out of the associated cache in order to prevent escalation of defective data to the rest of the system when a dataflow uncorrectable error or correctable error occurs, purges the associated cache.

6. The computer system according to claim 5 wherein a purge checks a cache line containing bad data to see if it was changed, and if changed, the data is cast-out to the PMAs correcting any correctable errors and changing uncorrectable errors to a special uncorrectable error pattern whose syndrome has a hamming distance of at least two from that of any correctable error or good data pattern to ensure that the data will continue to be unused.

7. The computer system according to claim 5 wherein a purge of a cache entry, which previously has had correctable errors or uncorrectable errors, deletes the cache entry.

8. The computer system according to claim 5 wherein a purge of a cache entry which previously has no correctable errors or uncorrectable errors marks a cache line purged of the cache entry invalid.

9. The computer system according to claim 3 wherein said uncorrectable error recovery cache fetch and store logic operations, during reading data out of the associated cache in order to prevent escalation of defective data to the rest of the system when a dataflow uncorrectable error occurs, notifies a CP to abend the CP's job and data is blocked from entering the associated cache.

10. The computer system according to claim 3 wherein said uncorrectable error recovery cache fetch and store logic operations checks, during reading data out of the associated cache in order to prevent escalation of defective data to the rest of the computer system when a dataflow uncorrectable error occurs, for an uncorrectable error syndrome to see whether said uncorrectable error syndrome has a special uncorrectable error pattern whose syndrome has a hamming distance of at least two from that of any correctable error or good data pattern to ensure that the data will continue to be unused, and if it has such special uncorrectable error pattern, the uncorrectable error recovery cache fetch and store logic operations determine that the bad data was due to cache failure, not memory, and the CP is notified to abend the CP job.

11. The computer system according to claim 3 wherein said uncorrectable error recovery cache fetch and store logic operations, during reading data out of the associated cache in order to prevent escalation of defective data to the rest of the system when a dataflow uncorrectable error occurs, block uncorrectable error data from entering the associated cache and notify the CP to abend the CP job.

12. The computer system according to claim 3 wherein said uncorrectable error recovery cache fetch and store logic operations, during reading data out of the associated cache in order to prevent escalation of defective data to the rest of the system when a dataflow uncorrectable error occurs, checks the computer system for an uncorrectable error syndrome to see whether said uncorrectable error syndrome has a special uncorrectable error pattern and if it is determined not to have a special uncorrectable error pattern, the uncorrectable error recovery cache fetch and store logic operations determine that any bad data is due to memory and a page containing determined bad data is taken offline.

13. The computer system according to claim 3 wherein said uncorrectable error recovery cache fetch and store logic operations, during storing data from the CPs into the associated cache in order to prevent escalation of defective data to the rest of the system when a dataflow uncorrectable error occurs, blocks a CP store from the associated cache and the CP is notified to abend the CP job.

14. The computer system according to claim 3 wherein said uncorrectable error recovery cache fetch and store logic operations, during storing data from the remote cache to the associated cache in order to prevent escalation of defective data to the rest of the system when a dataflow uncorrectable error occurs, upon checking the associated cache line store data to see if it was changed, and if it was changed, loads the associated cache line into the associated cache, correcting any correctable errors and changing uncorrectable errors to a special uncorrectable error pattern whose syndrome has a hamming distance of at least two from that of any correctable error or good data pattern to ensure that the data will continue to be unused.

15. The computer system according to claim 3 wherein said uncorrectable error recovery cache fetch and store logic operations, during storing data from the remote cache to the associated cache in order to prevent escalation of defective data to the rest of the system when a dataflow uncorrectable error occurs, upon checking the associated cache line store data to see if it was changed, and if it was not changed, blocks the associated cache line from being loaded into the associated cache, and the CP is notified to abend the CP job.

16. The computer system according to claim 1 wherein said one or more CPs is connected to a store logic and a fetch logic is used to detect and correct data errors and to write the resulting data into said associated cache, and wherein said store logic and fetch logic blocks UEs from the associated cache for CP stores, for PMA (mainstore) fetches/loads, and for cache-to-cache loads, with said uncorrectable error recovery cache fetch and store logic injecting 'Special UEs' into the associated cache when loads cannot be blocked and abends CP jobs for UEs during CP stores, for UEs from PMA, for UEs from remote cache, and for UEs from local cache.

17. The computer system according to claim 16 wherein said uncorrectable error recovery cache fetch and store logic operations perform reconfiguring of memory when UEs are detected in memory; blocks cache data propagation on UEs for CP fetches, and for Cache-to-Cache transfer if data is unchanged, and for PMA castouts if data is unchanged, as well as forces castouts when UEs appear on changed cache data; injects 'Special UEs' for UEs detected on changed cache data; invalidates the cache when UEs are detected in the local cache; and only deletes cache entries that have repeated failures.

* * * * *